United States Patent [19]

Shiga et al.

[11] 4,337,326
[45] Jun. 29, 1982

[54] PROCESS FOR PRODUCING PROPYLENE-ETHYLENE BLOCK COPOLYMERS

[75] Inventors: Akinobu Shiga; Masahiro Kakugo; Hajime Sadatoshi; Kazuki Wakamatsu; Hiroshi Yoshioka, all of Niihama, Japan

[73] Assignee: Sumitomo Chemical Company, Limited, Osaka, Japan

[21] Appl. No.: 194,954

[22] Filed: Oct. 8, 1980

[30] Foreign Application Priority Data

Oct. 13, 1979 [JP] Japan .............................. 54-132004

[51] Int. Cl.³ ........................................... C08F 297/08
[52] U.S. Cl. .................................... 525/244; 525/323; 525/267
[58] Field of Search ............................... 525/323, 244

[56] References Cited

U.S. PATENT DOCUMENTS 4,113,802 9/1978 Matteoli ............................. 525/270

FOREIGN PATENT DOCUMENTS 44-20621 9/1969 Japan .
48-2578 1/1973 Japan .
49-24593 6/1974 Japan .

Primary Examiner—Carman J. Seccuro
Attorney, Agent, or Firm—Cushman, Darby & Cushman

[57] ABSTRACT

A process for producing a propylene-ethylene block copolymer by subjecting propylene and ethylene to three-step polymerization using a stereoregular polymerization catalyst, which comprises in the first step polymerizing propylene alone or a propylene/ethylene mixture so that the average ethylene/propylene reaction ratio is 6/94 or less, thereby polymerizing 60 to 95% by weight of the total polymerization amount, in the second step polymerizing a propylene/ethylene mixture so that the average ethylene/propylene reaction ratio is 25/75 to 67/33, thereby polymerizing 1 to 20% by weight of the total polymerization amount, and in the third step polymerizing a propylene/ethylene mixture so that the average ethylene/propylene reaction ratio is 76/24 to 89/11, thereby polymerizing 4 to 35% by weight of the total polymerization amount, wherein in the second and third steps, ethylene alone is supplied thereby gradually decreasing the amount of propylene in the polymerization system from the first step to the succeeding steps.

3 Claims, No Drawings

PROCESS FOR PRODUCING PROPYLENE-ETHYLENE BLOCK COPOLYMERS

The present invention relates to a process for producing propylene-ethylene block copolymers improved in properties, particularly, such as impact resistance, stiffness, transparency and impact blushing. Crystalline polyolefins have been produced on a commercial basis since a stereoregular catalyst was invented by Ziegler and Natta. Particularly, crystalline polypropylene has been used as a general-purpose resin having excellent stiffness and heat resistance.

Crystalline polypropylene, however, has the drawback that it is brittle at low temperatures, so that it is not suitable for usages requiring impact resistance at low temperature. Many improvements have already been proposed as a result of extensive studies to overcome this drawback. Of these improvements, those disclosed in Japanese Patent Publication Nos. 14834/1963, 1836/1964 and 15535/1964 are particularly useful from the industrial point of view. They are a process including the block copolymerization of propylene and other olefins, particularly, ethylene.

But, block copolymers produced by these well-known methods also have drawbacks. For example, they are inferior to the crystalline polypropylene in the stiffness and transparency of molded or fabricated products. Further, when the block copolymers are deformed by impact or bending, blushing appears at the deformed portion (referred to as "impact blushing" hereinafter), which leads to a remarkable reduction in commercial value.

In order to improve such drawbacks, there have been proposed many processes in which the block copolymerization is carried out in three steps. Specifically, Japanese Patent Publication No. 20621/1969 discloses an improvement in transparency, Japanese Patent Publication No. 24593/1974 an improvement in impact blushing and Japanese Patent Publication (unexamined) No. 25781/1973 an improvement in impact resistance.

In general, however, these properties, impact resistance, stiffness, transparency and impact blushing are in competition with one another, so that satisfactory, well-balanced polymers can not be obtained by these well-known processes.

The inventors extensively studied to overcome these difficulties, and found a process for obtaining polymers which are markedly well balanced in the physical and optical properties.

An object of the present invention is to provide a novel process for producing propylene-ethylene block copolymers which comprises carrying out polymerization in three steps using a stereoregular polymerization catalyst.

Another object of the present invention is to provide propylene-ethylene block copolymers markedly well-balanced in impact resistance, stiffness, transparency and impact blushing.

Other objects and advantages of the present invention will be apparant from the following descriptions.

According to the present invention, there is provided a polymerization process for producing propylene-ethylene block copolymers, by subjecting propylene and ethylene to a three-step polymerization using a stereoregular polymerization catalyst, characterized in that the first-step polymerization is carried out by polymerizing propylene alone or a propylene/ethylene mixture so that the average ethylene/propylene reaction ratio {the molar ratio of ethylene to propylene which are taken into the copolymer (referred to as "ethylene/propylene reaction ratio" hereinafter)} is 6/94 or less, preferably 4.5/95.5 or less, thereby polymerizing 60 to 95% by weight, preferably 65 to 93% by weight, of the total polymerization amount, the second-step polymerization is carried out by polymerizing a propylene/ethylene mixture so that the average ethylene/propylene reaction ratio is 25/75 to 67/33, preferably 30/70 to 60/40, thereby polymerizing 1 to 20% by weight, preferably 2 to 18% by weight, of the total polymerization amount, and the third-step polymerization is carried out by polymerizing an ethylene/propylene mixture so that the average ethylene/propylene reaction ratio is 76/24 to 89/11, thereby polymerizing 4 to 35% by weight, preferably 6 to 30% by weight, of the total polymerization amount, wherein, in the second and third steps, ethylene alone is supplied thereby gradually decreasing the amount of propylene in the polymerization system from the first step to the succeeding steps.

The process of the present invention will be illustrated in detail hereinafter.

The propylene-ethylene block copolymerization of the present invention can be carried out in substantially the same manner as in the conventional polymerization for producing isotactic polypropylene using a stereoregular polymerization catalyst, except that said block copolymerization is divided into many steps and that attention needs to be given to the ethylene/propylene reaction ratios and polymerization amounts in the second and third steps.

Consequently, as the stereoregular polymerization catalyst used in the present invention, there are used the well-known catalysts consisting essentially of titanium trichloride, an organo-aluminum compound and optionally a stereoregularity-improving agent.

Herein, the titanium trichloride may include its composition.

As examples of the titanium trichloride there may be given, for example, titanium trichloride produced by the reduction of titanium tetrachloride with a metal or organo-metallic compound, or, further, the activation of the reduction product; products obtained by the pulverization of the foregoing substances; titanium trichloride obtained by the method disclosed in British Patent No. 1391067; and titanium trichloride obtained by the methods disclosed in U.S. Pat. No. 4,165,298.

The organo-aluminum compound includes for example dimethylaluminum chloride, diethylaluminum chloride, diisobutylaluminum chloride, diethylaluminum bromide and triethylaluminum. Of these compounds, diethylaluminum chloride is particularly preferred.

The stereoregularity-improving agent used as a third component of the catalyst includes for example the well-known compounds such as amines, ethers, esters, sulfur, halogen, benzene, azulene derivatives, organic or inorganic nitrogen compounds and organic or inorganic phosphorus compounds.

The polymerization of the present invention may be carried out in either of inert hydrocarbon or liquid propylene monomer in the substantial absence of an inert hydrocarbon. Further, it may be carried out in a gaseous phase. The polymerization temperature is not particularly limited, but generally, it is within a range of 20° to 90° C., preferably 40° to 80° C. The polymerization is carried out in the presence of the foregoing catalyst.

At the first step of the polymerization, propylene alone is polymerized, or a propylene/ethylene mixture is polymerized so that the average ethylene/propylene reaction ratio is 6/94 or less, preferably 4.5/95.5 or less. In the case of the polymerization of propylene, polymers having the physical properties markedly well balanced can be obtained by carrying out the subsequent polymerization of the present invention. When improvements in transparency, impact blushing and impact strength are desired at a little sacrifice of stiffness if necessary, a small amount of ethylene is added.

In the copolymerization, propylene and a small amount of ethylene may be polymerized at the same time in a mixed state, or propylene alone may be first polymerized followed by copolymerization of a mixture of propylene and a small amount of ethylene. In either case, almost the same effect can be obtained.

When the ethylene/propylene reaction ratio exceeds the scope of the present invention, stiffness is extremely lowered.

In this polymerization step, preferably the well-known molecular weight-regulating agent such as hydrogen is added in order to regulate the melt processability of the polymer.

The second step of the polymerization follows the first step. In this step, copolymerization is carried out by polymerizing a propylene/ethylene mixture so that the average ethylene/propylene reaction ratio is 25/75 to 67/33, preferably 30/70 to 60/40. The reaction ratio below 25/75 is not desirable because impact strength particularly at lowered temperatures characteristic of propylene-ethylene block copolymers becomes poor. The reaction ratio above 67/33 is not also desirable because impact strength becomes poor.

In the second step, ethylene alone is supplied to the polymerization system. Propylene is not supplied, and, if necessary, a part of propylene in the reactor after the first polymerization step may be removed from the reactor prior to the second step polymerization thereby adjusting propylene/ethylene ratio in the second polymerization system to a desired value. Particularly, in the second step, the molar ratio of total amount of ethylene supplied and present in the system to propylene present in the system is in the range of from 10/90 to 60/40, preferably from 15/85 to 50/50.

In this step, a molecular weight-regulating agent is not particularly necessary.

The third step of the polymerization follows the second step. In this step, copolymerization is carried out by polymerizing ethylene/propylene mixture so that the average ethylene/propylene reaction ratio is 76/24 to 89/11. The reaction ratio below 76/24 is not desirable because stiffness, impact blushing and transparency becomes poor.

The reaction ratio above 89/11 is not also desirable becuae impact strength particularly at room temperature becomes poor depending upon the polymerization conditions at the second step. In this step, preferably, the well-known molecular weight-regulating agent such as hydrogen is added to regulate the melt processability of the copolymer.

In the third step, ethylene alone is supplied to the polymerization system. Propylene is not supplied and, if necessary, a part of propylene may be removed from the reactor in the same manner as in the second step. Particularly, in this step, the molar ratio of ethylene to propylene present in the system is preferably in the range of from 25/75 to 60/40.

The three-step polymerization of the present invention may be carried out in a continuous way using three or more vessels, or in a batchwise way using one or more vessels, or in combination of the both.

Further, the three-step polymerization may be repeated several times.

The block copolymer described above can be obtained with a variety of embodiments. Particularly, when each step is finished, the unreacted propylene required in the succeeding step is reserved, and the propylene existing in the system is gradually reduced with progress of the step.

This method is preferable to obtain the desired ethylene/propylene reaction ratio in each step economically. Consequently, in the second and third steps, a method comprising supplying ethylene alone and copolymerizing ethylene and propylene is preferably used. Particularly, when the present invention is carried out in an inert solvent, it is possible to reduce to extremely large extent the amount of propylene to be purged.

A preferable embodiment of the present invention performed by a batch process is shown below.

In the first step, propylene is polymerized alone or under the addition of small amount of ethylene, by supplying the monomer(s) at a relatively high pressure during the early stage of the step. After a certain duration, the feeding of propylene is ceased while continuing the polymerization whereby a requisite amount of propylene necessary in the following second and third steps is secured. In other words, the amount of propylene monomer in the polymerization system is decreased by continuing the polymerization so as to reach the desired amount of propylene monomer. It is permissible, if necessary, to purge the excess amount of monomer(s) at the end of the first step.

After the first step is over, the second step of the polymerization is allowed to start by supplying ethylene monomer to the system. The amount of ethylene to be supplied should be determined taking into account of the amount of monomers remaining in the system and of the ethylene/propylene reaction ratio determined by the polymerization conditions, so as to obtain the desired copolymer. In practice, the polymerization is performed in such a manner; that the ethylene/propylene reaction ratio lies in the specified range in the present invention, and preferably, so as to maintain a constant reaction ratio over the entire course of the step, under the regulation of the amount of ethylene to be fed in accordance with the decrement of the remaining amount of propylene so as to decrease the pressure of the reaction system gradually.

When a monomer mixture of ethylene and propylene is supplied at relatively higher pressure in the second step of the polymerization, the degree of saturation (super-saturation) of propylene in the reaction mixture in the third step after purging off of unreacted monomers varies depending on the size of the reaction vessel, condition of the slurry in the reaction vessel, condition of agitation and so on, so that unchanged steady polymerization cannot be expected. On the contrary, by performing the second step as defined by the present invention, a constant and unchanged polymerization in the third step is warranted always in an easier manner, since a condition close to saturation of propylene is achieved regardless of the polymerization condition.

In the third step, the polymerization is carried out while supplying ethylene, so as to attain an average ethylene/propylene reaction ratio lying within the range prescribed according to the present invention.

In the following, the present invention is further explained by exemplifying a continuous form of the process also in a preferable embodiment.

For carrying out the process according to the present invention in a continuous manner, three or more reaction vessels are used in serial connection. Here, the first step of the polymerization is performed by employing one or more reaction vessels. The first step can be effected in a similar manner as in the batch-wise process, for example, by a propylene polymerization, followed by purging off of the unreacted monomer(s), or polymerization through two or more vessels connected in series wherein the feeding of propylene is excluded in the final vessel to attain the requisite decrease of the propylene monomer content at the end of the step, which can be followed, if necessary, by the purging off of excess monomer(s).

The second step of the polymerization is conducted in one or more reaction vessels by supplying ethylene to effect the ethylene/propylene copolymerization under the consumption of propylene monomer unreacted and retained in the system. Here, it is permitted to conduct the polymerization, as in the batchwise operation, in two or more reaction vessels to realize the sequential pressure decrease, with occasional employment of further purging off of unreacted propylene monomer in case propylene monomer is reserved excessively.

The third step of the polymerization is effected under the supply of ethylene in one or more reaction vessels.

While it is possible to carry out the polymerization according to the present invention either in a medium of the liquefied monomers under the substantial exclusion of any inert solvent or in gaseous phase, it is preferable for an economical production of the copolymer, to conduct the polymerization in such a manner, that the first step is effected either in the liquefied monomer or in gaseous phase and the following second and third steps are conducted in gas phase. Here, it is recommended to pursue the procedure to realize the gradient decrease of propylene monomer content through the first, second and third steps.

While it is preferable to perform the process in the form of embodiment in which ethylene only is supplied in the second and third steps, it is permissible to incorporate an addition of propylene monomer. Through the course of second and third steps, when propylene becomes wanting.

The present invention will be illustrated more specifically with reference to the following examples and comparative examples which are not however to be interpreted as limiting the invention thereto.

The results of the examples are shown in Tables 1 to 6. The values of physical properties in the tables were those measured by the following testing methods.

Melt index: ASTM D 1238-57T
Brittle temperature: ASTM D 746
Stiffness: ASTM D 747-58T
Haze: ASTM D 1003
  Test sample: Sheet (1 mm thick) molded by pressing.
Izod impact strength: ASTM D 256
  Test temperature: 20° C., −20° C.
Impact blushing: Injection-molded sheet (1 mm thick) is placed at 20° C. on a Du Pont impact tester; the hemispherical tip (radius 6.3 mm) of the dart is contacted with the sheet; impact is given to the top of the dart with the 20 cm or 50 cm natural fall of a weight (1 kg); and the area of the blushed portion is measured.
Intrinsic viscosity (referred to as $[\eta]$ for brevity): $[\eta]$ is measured at 135° C. in tetralin.

These values were measured using test samples prepared as follows: The polymer particles obtained by the examples were mixed with the well-known additives such as an antioxidant, formed into pellets through an extruder and then pressed or injection-molded.

EXAMPLE 1

An autoclave having a capacity of 360 l and equipped with a stirrer, which had been evacuated preliminarily, was pressurized with propylene to a pressure of 1 Kg/cm$^2$ gauge and then evacuated to −600 mm Hg gauge. This procedure was repeated three times.

Then, 100 l of heptane, 28 g of titanium trichloride (a product of the firm Toho-Titanium with trade name of TAC 132) and 320 g of diethylaluminum chloride were charged therein.

In the first step of the polymerization, propylene monomer was supplied at a polymerization temperature of 70° C. in the presence of hydrogen until a pressure reached 14 Kg/cm$^2$ gauge. At this occasion, the supply of propylene was stopped and the polymerization was continued to consume the propylene monomer in the system until the pressure in the system decreased to 6 Kg/cm$^2$ gauge.

Thereafter, the remaining unreacted monomer was purged off until the pressure reached to 2.5 kg/cm$^2$ gauge and then, the temperature was adjusted at 65° C.

In the second step, the polymerization was further advanced in such a manner, that the autoclave was charged with ethylene at a polymerization temperature of 60° C. to increase the pressure, and then, the polymerization was caused to proceed by adjusting the feeding of ethylene so as to maintain a constant ethylene/propylene reaction ratio until the polymerization pressure reached to 1.8 Kg/cm$^2$ gauge.

Then, 60 l of heptane were added thereto and the temperature was adjusted at 52° C.

The third step of the polymerization was conducted in such a manner, that the pressure was elevated once to 2 Kg/cm$^2$ gauge by charging ethylene in the system and then the polymerization was caused to proceed at 52° C. in the presence of hydrogen while supplying ethylene.

The resulting polymerization mixture in the form of slurry was subjected to the decomposition of catalyst by the addition of butanol. After it was filtered and dried, a white powdery polymer product was obtained.

The $[\eta]$-values estimated by the samples taken after the end of each step and the ethylene/propylene reaction ratios for the second and third steps as well as the percent polymerization in each step, both calculated from the materials balance, are recited in Table I. The material properties of the polymer obtained are summarized in Table II.

Besides, it has been confirmed from another estimation of ethylene/propylene reaction ratio by a known method using infrared absorption spectra, that this value is nearly concordant with that obtained from the calculation of materials balance.

The molar ratio of total ethylene supplied into the system to the existing propylene corresponded to 30/70 in the second step and the molar ratio of ethylene to propylene present in the system corresponded to 42/58 in the third step. This measure also applies to Comparison Examples given below.

COMPARISON EXAMPLES 1, 2 and 3

Similar to Example 1, the first step is carried out in such a manner that propylene was supplied at a polymerization temperature of 70° C. in the presence of hydrogen and the polymerization was continued after the stoppage of supply of propylene until a pressure reached 5 Kg/cm² gauge. Then, the remaining unreacted monomer was purged off up to the pressure given below:

| Comparsion Example | 1 | 2 | 3 |
|---|---|---|---|
| Purge Pressure (Kg/cm² gauge) | 2.1 | 2.6 | 1.0 |

In the second step, the polymerization was further advanced in such a manner, that the autoclave was first charged with ethylene and maintained at a temperature of 60° C. and then, the polymerization was pursued in the presence of hydrogen by feeding an ethylene/propylene mixture so as to maintain a constant ethylene/propylene reaction ratio.

The resulting polymerization slurry was treated in a similar manner as in Example 1. A white powdery polymer was obtained.

The particulars in the polymerization and the material properties of the products are summarized in Tables I and II respectively.

In Comparison Examples 1, 2 and 3, each a propylene/ethylene block copolymer was produced according to a conventional two-step process, wherein the polymerization in Comparison Example 1 was performed by maintaining an ethylene/propylene reaction ratio corresponding to the average of those in the second and third steps of Example 1 and the polymerizations in Comparison Examples 2 and 3 were carried out by maintaining ethylene/propylene reaction ratio equivalent to those in the second and third steps of Example 1 respectively.

According to the conventional two-step process, it may be possible to obtain polymer product superior in the impact strength and brittle temperature which are characteristic of a block copolymer, by an adequate selection of the polymerization condition. However, the so obtained product is quite inferior in transparency and is poor in the impact blushing and stiffness, and thus is poor in the balance of material properties.

On the contrary, according to the process of the present invention, a polymer product showing excellent balance in the material properties can be obtained without deteriorating the characteristic properties, i.e. the impact strength and brittle temperature.

EXAMPLE 2

(1) Synthesis of Catalyst (a) In a 200 l autoclave equipped with stirrer, 45.5 l of hexane and 11.8 l of TiCl₄ were charged. While maintaining this solution at a temperature between −10° and −5° C., there was added dropwise a solution composed of 43.2 l of hexane and 13.5 l of diethylaluminum chloride over 3 hours under agitation. The reaction mixture was then kept at a temperature between −10° and 0° C. for 15 minutes. Thereafter, the temperature of the mixture was elevated to 65° C. in two hours. After maintaining at this temperature for further two hours, the solid formed (referred to as reduced solid) was separated from the liquid phase, which was then washed 6 times with 50 l of hexane and thereafter separated from hexane.

(b) The so obtained reduced solid was suspended in 92 l of hexane and thereto were added 19.6 l of diisoamyl ether. After this suspension was agitated for 1 hour at 35° C., the solid (denoted hereinafter as ether-treated solid) was removed from the liquid phase and was washed with 50 l of hexane 6 times, whereupon the hexane was separated. To the so obtained ether-treated solid, there were added 60 l of a 40 vol.-% solution of TiCl₄ in hexane and the suspension was stirred for 2 hours at 70° C.

The so reacted solid was separated from the liquid phase and was washed 10 times with 50 l of hexane, whereupon it was separated from hexane to dry.

The thus obtained solid was termed "titanium trichloride solid catalyst I".

(2) Propylene-Ethylene Block-copolymerization

A 250 l autoclave equipped with stirrer was evacuated, whereupon it was pressurized with propylene to 1 Kg/cm² and than evacuated to −600 mm Hg gauge and this procedure was repeated three times. Subsequently, the autoclave was charged with 75 l of heptane, 8.5 g of titanium trichloride solid catalyst I and 128 g of diethylaluminum chloride to start the polymerization.

The first step of the polymerization was conducted in the presence of hydrogen in such a manner, that the polymerization proceeded during the preceding period under successive feeding of propylene monomer at a pressure of 9 Kg/cm² gauge at 70° C. and, in the succeeding period, the polymerization was further advanced at 75° C. without feeding of propylene monomer until the polymerization pressure reached 5 Kg/cm² gauge. Then, the unreacted monomer was discharged up to an internal pressure of 1.7 Kg/cm² gauge and the temperature was adjusted at 60° C.

The second step was conducted at a polymerization temperature of 60° C. while feeding ethylene so as to keep a constant ethylene propylene reaction ratio until the polymerization pressure fell to 0.5 Kg/cm² gauge. Then, 23 l of heptane were added thereto.

The third step was carried out at a polymerization temperature of 60° C. in the presence of hydrogen by succeeding the polymerization by charging ethylene up to a pressure of 2 Kg/cm² gauge.

The resulting polymer slurry was treated quite the same as in Example 1 by adding 4 l of butanol, whereby a white powdery polymer was obtained.

The particulars of the experimental condition as well as the results thereof are recited in Tables III and IV.

EXAMPLES 3 and 4

A 360 l autoclave having stirrer was charged, after it had been replaced in the same manner as in Example 1, with 100 l of heptane and 320 g of diethylaluminum chloride together with titanium trichloride to carry out the three-step polymerization.

The first step was conducted in such a manner, that the polymerization proceeded during the preceding period under feeding propylene monomer at a pressure of 9 Kg/cm² gauge at 70° C. and, in the succeeding period, the polymerization was further advanced without feeding propylene monomer until a pressure reached 5 Kg/cm² gauge. Then, the temperature was adjusted at 60° C. and a procedure of monomer discharge up to predetermined pressure was employed.

The second step was conducted at a polymerization temperature of 60° C. by charging ethylene up to an elevated pressure and subsequent feeding of ethylene so as to further advance the polymerization until pressure reached predetermined value.

The third step was carried out at a polymerization temperature of 50° C. by charging ethylene up to an elevated pressure and subsequent feeding of ethylene so as to succeed the polymerization.

The first and the third steps of the polymerization were carried out under an addition of hydrogen gas.

Then, the after-treatment same as in Example 1 was performed to obtain a white powdery polymer.

The particulars of the experimental condition and the results thereof are summarized in Table III and in Tables IV and V respectively.

Here, a titanium trichloride solid catalyst II employed in Example 3 had been prepared by the manner given below:

Synthesis of Catalyst (a) In a 200 l autoclave equipped with stirrer, 52 l of hexane and 13.5 l of titanium tetrachloride were charged. To this solution, while maintaining it at a temperature between −10° and −5° C., a solution composed of 35 l of hexane and 16.5 l of diethylaluminum chloride was added dropwise over 4 hours under agitation.

Then, the temperature was elevated to 105° C. and agitation was continued further 2 hours at this temperature. After cooling by keeping still at room temperature, the so reacted solid was separated from the liquid phase, which was then washed with 50 l of hexane 6 times to leave a heat treated solid.

(b) The so obtained heat treated solid was suspended in 120 l of toluene and thereto were added 26 l of di-n-butyl ether and 2.8 Kg of iodine, whereupon the mixture was agitated at 95° C. for 1 hour. After the mixture was kept at room temperature, the solid was separated from the liquid phase and washed with 50 l of hexane 6 times to subject to drying. The so obtained solid was designated as titanium trichloride solid catalyst II.

COMPARISON EXAMPLES 4 and 5

The procedures of Examples 3 and 4 were followed respectively in Comparison Examples 4 and 5, except that the catalyst was changed, that the polymerization conditions in the second and third steps were altered and that a part of the monomers remaining unreacted at the end of the second step was purged off as they remained in excess of the requisite amount in the third step. The particulars of the experimental conditions and the results thereof as well as the material properties of the products are recited in Table III and in Tables IV and V respectively.

Comparison Examples 4 and 5 represent the case in which the block copolymer was produced by a three-step polymerization other than the process according to the present invention. It is shown, that the copolymer products of these Comparison Examples are superior in the stiffness, transparency and impact blushing but show impact strength and brittle temperature lying in an extremely low level, and hence, the balance of material properties are poor.

On the contrary, the products of Examples 2, 3 and 4 representing the present invention are improved in impact blushing and transparency without deteriorating the characteristic features of a block copolymer, i.e. impact strength and brittle temperature, so that it is clear that they are well-balanced in the material properties.

TABLE I

|  | First Step | | Second Step | | | Third Step | | |
|---|---|---|---|---|---|---|---|---|
|  | $[\eta]$ dl/g | percent polymerization wt % | $[\eta]$ dl/g | Ethylene/ propylene reaction ratio mole ratio | percent polymerization wt % | $[\eta]$ dl/g | Ethylene/ propylene reaction ratio mole ratio | percent polymerization wt % |
| Example 1 | 1.71 | 76 | 2.08 | 51/49 | 6 | 3.40 | 84/16 | 18 |
| Comparison Example 1 | 1.79 | 80 | 2.95 | 74/26 | 20 | — | — | — |
| Comparison Example 2 | 1.81 | 82 | 2.96 | 54/46 | 18 | — | — | — |
| Comparison Example 3 | 1.70 | 76 | 3.24 | 83/17 | 24 | — | — | — |

TABLE II

|  | Melt index g/10 min. | Brittle temp. °C. | Flexural stiffness Kg/cm² | Haze % | Izod impact strength | | Impact Blushing | |
|---|---|---|---|---|---|---|---|---|
|  |  |  |  |  | 20° C. Kg . cm/cm² | −20° C. | 20 cm cm² | 50 cm |
| Example 1 | 1.8 | −33 | 9500 | 85 | 13 | 5.0 | 1.6 | 3.1 |
| Comparison Example 1 | 2.7 | −24 | 9600 | 93 | 6.4 | 3.7 | 2.5 | 4.9 |
| Comparison Example 2 | 3.1 | −33 | 8700 | 96 | 16 | 5.0 | 1.9 | 3.8 |
| Comparison Example 3 | 2.3 | −15 | 10600 | 91 | 5.9 | 3.4 | 1.3 | 2.5 |

TABLE III

| Polymerization condition | Example 3 | Example 4 | Comparison Example 4 | Comparison Example 5 |
|---|---|---|---|---|
| Polymerization catalyst | Titanium trichloride solid catalyst II, 10 g | Titanium trichloride solid catalyst I, 10 g | Titanium trichloride solid catalyst I, 10 g | TAC-132 29 g |
| First Step Polymerization | | | | |

TABLE III-continued

| Polymerization condition | Example 3 | Example 4 | Comparison Example 4 | Comparison Example 5 |
|---|---|---|---|---|
| temperature(°C.) | 60 | 60 | 60 | 60 |
| Polymerization pressure(Kg/cm²G) | 9 | 9 | 9 | 9 |
| Decreased reaction pressure(Kg/cm²G) | 5 | 5 | 5 | 5 |
| Purged reaction pressure(Kg/cm²G) | 1.4 | 2.1 | 2.4 | 2.2 |
| Second Step Polymerization temperature(°C.) | 50 | 50 | 50 | 50 |
| Final pressure(Kg/cm²G) | 1.0 | 0.8 | 0 | 0 |
| Ethylene/propylene mole ratio I* | 26/74 | 24/76 | 3.5/96.5 | 13/87 |
| Third Step Polymerization temperature(°C.) | 50 | 50 | 50 | 50 |
| Elevated pressure(Kg/cm²G) | 2.0 | 2.0 | 2.0 | 2.5 |
| Ethylene/propylene mole ratio II** | 40/60 | 45/55 | 53/47 | 65/35 |

*Ethylene/propylene mole ratio I represents the molar proportion of the amount of ethylene supplied versus the amount of propylene existing.
**Ethylene/propylene mole ratio II represents the molar proportion of ethylene versus propylene.

TABLE IV

| | First Step | | Second Step | | | Third Step | | |
|---|---|---|---|---|---|---|---|---|
| | $[\eta]$ dl/g | percent polymerization wt % | $[\eta]$ dl/g | Ethylene/propylene reaction ratio mole ratio | percent polymerization wt % | $[\eta]$ dl/g | Ethylene/propylene reaction ratio mole ratio | percent polymerization wt % |
| Example 3 | 1.81 | 78 | 2.17 | 45/55 | 5 | 3.16 | 84/16 | 17 |
| Example 4 | 1.79 | 75 | 2.15 | 37/63 | 7 | 3.20 | 86/14 | 18 |
| Comparison Example 4 | 2.14 | 79 | 2.23 | 7/93 | 6 | 2.83 | 92/8 | 15 |
| Comparison Example 5 | 1.90 | 80 | 2.08 | 21/79 | 5 | 2.97 | 95/5 | 15 |

TABLE V

| | Melt index g/10 min. | Brittle temp. °C. | Flexural stiffness Kg/cm² | Haze % | Izod impact strength | | Impact blushing | |
|---|---|---|---|---|---|---|---|---|
| | | | | | 20° C. Kg.cm/cm² | −20° C. Kg.cm/cm² | 20 cm cm² | 50 cm cm² |
| Example 3 | 2.3 | −30 | 9400 | 86 | 12 | 4.2 | 1.7 | 3.2 |
| Example 4 | 2.0 | −33 | 9200 | 84 | 13 | 4.7 | 1.6 | 3.2 |
| Comparison Example 4 | 1.8 | +5 | 11200 | 80 | 3.3 | 2.3 | 0.5 | 1.2 |
| Comparison Example 5 | 2.4 | −4 | 9800 | 85 | 5.3 | 2.7 | 0.5 | 1.1 |

TABLE VI

| | First Step | | | Second Step | | | Third Step | | |
|---|---|---|---|---|---|---|---|---|---|
| | $[\eta]$ dl/g | Ethylene/propylene reaction ratio mole ratio | percent polymerization wt % | $[\eta]$ dl/g | Ethylene/propylene reaction ratio mole ratio | percent polymerization wt % | $[\eta]$ dl/g | Ethylene/propylene reaction ratio mole ratio | percent polymerization wt % |
| Example 5 | 1.66 | 0.4/99.6 | 74.0 | 2.44 | 59/41 | 7.1 | 3.96 | 86/14 | 18.9 |

TABLE VII

| | Melt index g/10 min. | Brittle temp. °C. | Flexural stiffness Kg/cm² | Haze % | Izod impact strength | | Impact blushing | |
|---|---|---|---|---|---|---|---|---|
| | | | | | 20° C. Kg.cm/cm² | −20° C. Kg.cm/cm² | 20 cm cm² | 50 cm cm² |
| Example 5 | 1.9 | −41 | 9400 | 86 | 17 | 5.9 | 1.6 | 3.2 |

EXAMPLE 5

A 360 l reaction vessel (A) in a form of mixing tank was connected in series with a 400 l reaction vessel (B) of a form of fluidized bed to carry out therein a block copolymerization of propylene and ethylene.

The first step of the polymerisation was conducted as follows:

The reaction vessel (A) was charged, after the replacement performed as in Example 1, with 112 Kg of propylene and thereto were added 4.0 g of the titanium trichloride solid catalyst I, 224 g of diethylaluminum chloride and 5.2 g of methyl methacrylate, whereupon the temperature was adjusted at 70° C. The polymerization was carried out in the presence of hydrogen under an addition of small amount of ethylene for 3 hours in the reaction medium of liquefied propylene monomer. After the polymerization, the polymerization slurry ws transferred into the reaction vessel (B) and the unreacted monomers were then purged off until a pressure reached 10 Kg/cm² gauge.

The second step of the polymerization was conducted at 60° C. in such a manner, that, after the vessel (B) was further charged with ethylene monomer till the pressure was elevated up to 12 Kg/cm² gauge, the polymerization was further advanced in gaseous phase while feeding ethylene. At the end of the second step, the remaining unreacted monomers were purged off until a pressure reached 5 Kg/cm² gauge.

The third step was conducted thereafter at 60° C. in the presence of hydrogen by charging the vessel with ethylene up to an elevated pressure of 18 Kg/cm² gauge.

In the reaction vessel (B), a part of monomers was drawn out continuously at the top of the vessel and was returned via a heat exchanger to the vessel by blowing it into the bottom thereof in order to effect the fluidization of the polymer particles and in order to remove the heat of reaction.

After the completion of the polymerization, the polymer particles were transferred into an after-treatment tank equipped with stirrer, in which they were washed with a mixture of 0.5 l of propylene oxide and 170 l of propylene 4 times to remove the catalyst residue. A white powdery polymer was obtained.

Example 5 represents an embodiment of the process according to the present invention in which the polymerization is carried out in the absence of any inert solvent. It is seen that the product obtained in this Example shows also a superior balanced in material properties which is as excellent as that of the products obtained in Examples 1 to 4 employing an inert solvent.

We claim:

1. A process for producing a propylene-ethylene block copolymer by subjecting propylene and ethylene to three-step polymerization using a stereoregular polymerization catalyst, which comprises in the first step polymerizing propylene alone or a propylene/ethylene mixture in the presence of hydrogen so that the average ethylene/propylene reaction ratio is 6/94 or less, thereby polymerizing 60 to 95% by weight of the total polymerization amount, in the second step polymerizing a propylene/ethylene mixture so that the average ethylene/propylene reaction ratio is 25/75 to 67/33, thereby polymerizing 1 to 20% by weight of the total polymerization amount, and in the third-step adding ethylene in such manner that the molar ratio of ethylene to propylene present in the system is in the range of from 25/75 to 60/40, polymerizing a propylene/ethylene mixture in the presence of hydrogen so that the average ethylene/propylene reaction ratio is 76/24 to 89/11, thereby polymerizing 4 to 25% by weight of the total polymerization amount, wherein, in the second and third steps, ethylene alone is supplied thereby gradually decreasing the amount of propylene in the polymerization system from the first step to the succeeding steps.

2. The process according to claim 1, wherein in the second step the polymerization is conducted so that the average ethylene/propylene reaction ratio is 30/70 to 60/40, and in the third step ethylene is added in such manner that the molar ratio of ethylene to propylene present in the system is in the range of from 25/75 to 60/40.

3. The process of claim 1 consisting of the stated steps.

* * * * *